United States Patent [19]
Kuwano et al.

[11] Patent Number: 4,613,899
[45] Date of Patent: Sep. 23, 1986

[54] IMAGE PICKUP SYSTEM CAPABLE OF REPRODUCING A STEREO AND/OR A NONSTEREO IMAGE BY THE USE OF A SINGLE OPTICAL SYSTEM

[75] Inventors: Ryushi Kuwano; Riichi Nagura, both of Tokyo, Japan

[73] Assignee: NEC Corporation, Japan

[21] Appl. No.: 639,950

[22] Filed: Aug. 10, 1984

[30] Foreign Application Priority Data

Aug. 12, 1983 [JP] Japan ............................ 58-147549
Aug. 12, 1983 [JP] Japan ............................ 58-147550
Sep. 9, 1983 [JP] Japan ............................ 58-165965

[51] Int. Cl.$^4$ ............................................. H04N 13/02
[52] U.S. Cl. ........................................ 358/88; 358/91; 358/92; 358/109; 358/901
[58] Field of Search ................ 358/88, 91, 92, 109, 358/901

[56] References Cited

U.S. PATENT DOCUMENTS 2,856,809 10/1958 Blackstone ...................... 358/88
3,527,880 9/1970 Gordon ........................... 358/88
3,560,642 2/1971 Schroader ....................... 358/109
3,869,212 3/1975 Burcher .......................... 358/109
4,234,241 11/1980 Schmidt .......................... 358/88

Primary Examiner—Howard W. Britton
Attorney, Agent, or Firm—Ostrolenk, Faber, Gerb & Soffen

[57] ABSTRACT

In an image pickup system (15) which is carried on a craft (16) capable of flying along a flight path over an object zone, a single optical system (40) is disposed in the craft to form, on a focussing area (44), optical images of partial zones lying transversely of the flight path in the object zone. Forward and backward ones of the optical images that are picked up from forward and backward partial zones (P and Q) spaced apart from each other along the flight path are transduced into electrical signals by the use of photoelectric transducing members (41 and 42) placed on the focussing area with a gap left therebetween. The electrical signals are processed so that the forward and the backward images are concurrently reproduced on board the craft or in a terrestrial station to provide a stereo image. The forward optical image may be used to predict an intermediate one of the optical images that is to be picked up through a photoelectric transducing member (43) from an intermediate partial zone (R) between the forward and the backward partial zones. The intermedate optical image is processed to reproduce a high resolution image in accordance with a result of prediction.

14 Claims, 14 Drawing Figures

IMAGE PICKUP SYSTEM CAPABLE OF REPRODUCING A STEREO AND/OR A NONSTEREO IMAGE BY THE USE OF A SINGLE OPTICAL SYSTEM

BACKGROUND OF THE INVENTION

This invention relates to an image pickup system which is to be used in combination with a craft (such as a spacecraft, an aircraft, or the like) flying over an object zone (such as a ground surface of the earth or the like) which is to be imaged.

An image pickup system of the type described is used to remotely survey or sense an object zone, from a position on board a craft flying over the object zone along a flight path. It is often desirable to develop a stereo topographic image of the object zone by the use of such an image pickup system. In order to provide the stereo image, each object zone should be sensed along the flight path at two positions spaced apart from each other, so as to form two optical images of each object zone.

It is difficult to derive two optical images of the above-described type on a single craft at the same time in the usual manner. Therefore, it has been proposed to derive the stereo image with a displacement of the craft.

As will later be described with reference to FIGS. 1 and 2 of the accompanying drawing, a conventional image pickup system has at least two optical systems for deriving the stereo image. The conventional image pickup system is therefore heavy and bulky as compared with a conventional image pickup system which derives a nonstereo image. This makes it difficult to load the craft with the system. Moreover, at least two optical systems must be precisely adjusted with respect to each other. Such adjustment is very difficult and troublesome.

It is also often desirable to provide a topographic (or similar image at a high resolution so as to make up a precise topography or the like. This makes it necessary to receive and increased number of successive image signals on board the craft. It is often necessary to transmit these signals from the craft to terrestrial stations.

SUMMARY OF THE INVENTION

It is therefore an object of this invention to provide an image pickup system which is capable of deriving a stereo image and a plane image of an object zone using a simple structure.

It is another object of this invention to provide an image pickup system which is capable of effectively deriving a high resolution image of the object zone.

It is a specific object of this invention to provide an image pickup system of the type described, wherein only useful data are stored and transmitted from a craft to a terrestrial station and thereby increase efficiency of the transmission path.

An image pickup system according to this invention is for use in combination with a craft capable of flying along a flight path over an object zone. The image pickup system comprises:

(A) singel optical system for projecting an image of said object zone onto an image plane, said image plane having:

(1) a forward zone onto which said optical system projects an image of a first portion of said object zone; and (2) a rearward zone onto which said optical system projects an image of a second portion of said object zone; said first portion of said object zone being located at a position forward of said second portion of said object zone relative to the movement of said craft along said flight path whereby said forward zone of said image plane receives a forward optical image of a forward portion of said object zone and said rearward zone of said image plane receives a rearward optical image of a rearward portion of said object zone;

(B) first transducer means for converting only said forward optical image into forward electrical signals representative of said forward portion of said object zone;

(C) second transducer means for comverting only said rearward optical image into backward electrical signals representative of said rearward portion of said object zone; and (D) signal processing means for processing said forward and backward electrical signals.

BRIEF DESCRIPTION OF THE DRAWING

FIG. 5, is a schematic block diagram of a terrestrial station operable as a part of the image pickup system illustrated in FIG. 11.

DESCRIPTION OF THE PREFERRED EMBODIMENTS

Figure 1:
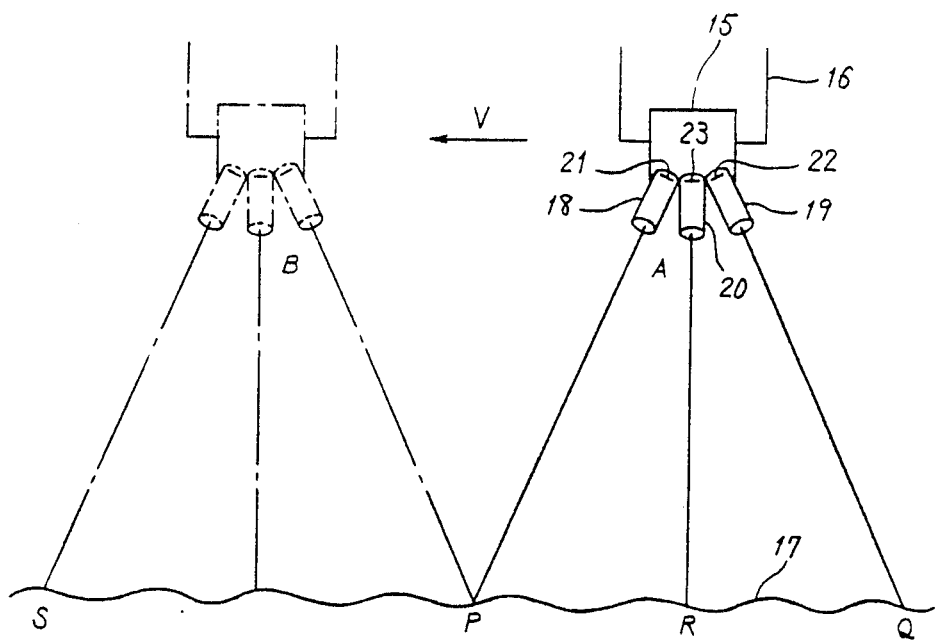
FIG. 1 is a pictorial view of a topographic area and a craft at two positions for use in describing a conventional image pickup system.

Referring to FIG. 1, description will be made as regards a conventional image pickup system in order to facilitate a clear understanding of this invention.

An image pickup system partly comprises an image pickup apparatus 15 carried on a spacecraft or a like craft which is schematically depicted at 16. It is assumed that the craft 16 flies over an object zone 17 at a velocity v along a flight path and that the image pickup apparatus 15 serves to pick up a stereo image and a nonstereo or mono image from the object zone 17, as will later become clear as the description proceeds. The illustrated apparatus 15 comprises first, second, and third optical systems 18, 19, and 20 viewing a forward zone P, a backward zone Q, and an intermediate zone R between the forward and the backward zones P and Q, respectively. The forward and the backward zones P and Q are spaced apart from each other along the flight path in the object zone 17 and located forward and backward relative to a traveling direction of the craft 16, respectively. The intermediate zone R is located right under the craft 16.

The optical systems 18 through 20 focus the respective images they are viewing onto respective photoelectric element members 21, 22, and 23. Photoelectric element members 21-23 convert the respective optical images into electrical signals representatives thereof. Each of the photoelectric element members 21 to 23 may be, for example, a linear array of charge coupled devices. When the craft 16 is at the flight position A, the first optical system 18 focuses the optical image of the forward zone P on the photoelectric element member 21 and the second and the third optical systems 19 and 20 pick up focus the optical images from the zones Q and R onto the photoelectric element members 22 and 23, respectively.

When the craft 16 reaches the flight position B, the optical image of the zone P is now picked up by the second optical system 19 rather than by the first optical system 18. Thus, a stereo image can be formed by processing the electrical signals derived from the photoelectric element member 21 at the flight position A and the electrical signals derived from the photoelectric element member 22 at the flight position B by a well-known stereoscopic effect.

The illustrated apparatus 15 can derive a nonstereo image from the intermediate zone R by the use of the third optical system 20. In any event, the conventional image pickup system must comprise at least two optical systems to derive the stereo image.

Figure 2:
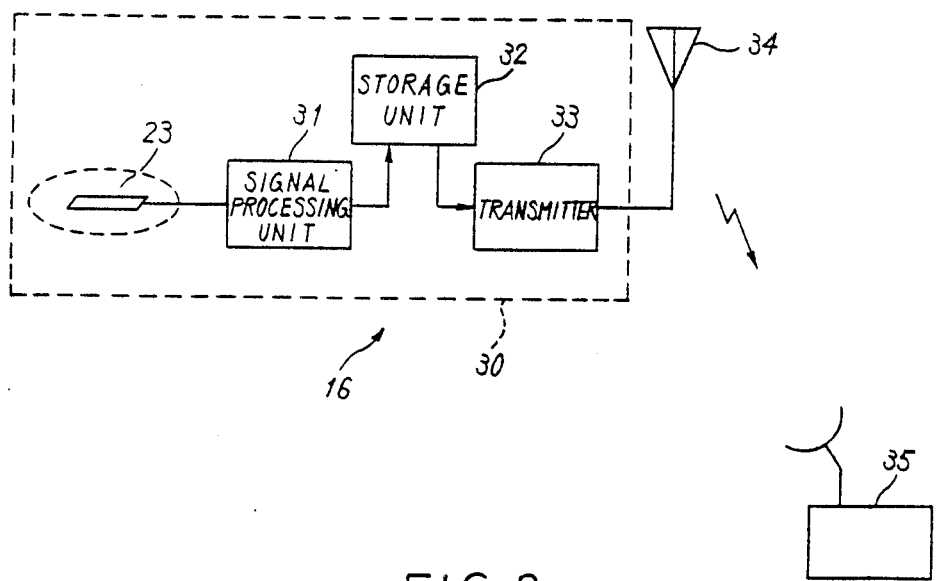
FIG. 2 is a schematic block diagram of a conventional signal processing circuit and a terrestrial station.

Referring to FIG. 2 together with FIG. 1, each of the photoelectric element members 21 to 23 (FIG. 1) is used in combination with a signal processing circuit 30. By way of example, the photoelectric element member 23 is depicted. The signal processing circuit 30 serves as another part of the image pickup system and comprises a signal processing unit 31 for encoding the electrical signals derived from the photoelectric element member 23 into a succession of encoded or digital image data. A storage unit 32 is for storing the encoded image data succession. A transmitter 33 is for reading the encoded image data succession out of the storage unit 32 and for transmitting the encoded image data succession through an antenna 34 towards a terrestrial station 35. The signal processing circuit 30 similarly deals with the electrical signals derived from the photoelectric element members 21 and 22.

Thus, the optical images of the object zone 17 are transduced or converted to the electrical signals by the respective photoelectric element members 21 to 23 and are transmitted in the form of the digital image data succession from the signal processing circuits, such as 30, to the terrestrial station 35.

Assuming that the craft 16 is an orbiting spacecraft and be positioned over a particular flight position at which the craft 16 is capable of transmitting the digital image data to the terrestrial station 35. The spacecraft 16 is at the particular flight position only a short while. The digital image data must be transmitted within a short interval of time. Each time when the spacecraft 16 is at a particular flight position from time to time, the digital image data is read out of the storage unit 32 and transmitted to the terrestrial station 35.

Since the bit rate of the digital image data is as high as several hundreds Mb/s, the storage unit 32 should have a large memory capacity. In this connection, it is preferable that only valid data are picked up from the object zones P, Q and R in order to reduce the memory capacity of the storage unit 32.

Figure 3:
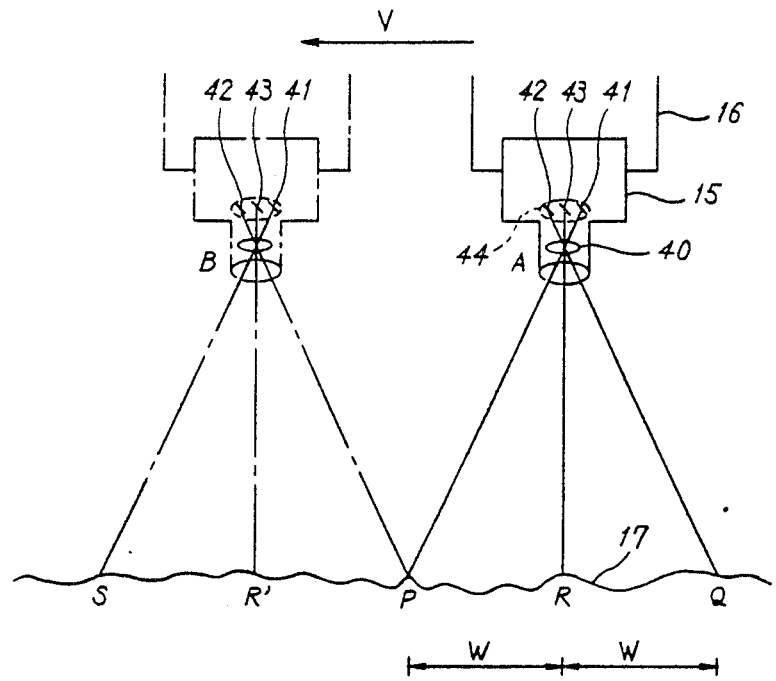
FIG. 3 is a pictorial view which is similar to FIG. 1 and is for use in describing an image pickup system according to a first embodiment of this invention.

Referring to FIG. 3, an image pickup system according to a first embodiment of the present invention comprises similar parts designated by like reference numerals. The image pickup apparatus 15 is carried on the craft 16 flying over the object zone 17 at the velocity v (meter/second) along a flight path. The craft 16 is assumed to be located at a flight position A. Like in FIG. 1, the illustrated image pickup apparatus 15 serves to detect both of a stereo image and a nonstereo image from the object zone 17.

The apparatus 15 comprises a single wide-angle optical system 40 directed towards the object zone 17. The optical system 40 forms optical images of the object zone 17 on a focussing area of an imaginary image plane 44. As will later be described more in detail, first through third photoelectric element members 41, 42, and 43 are disposed parallel to one another on the focussing area of the image plane 44 and transversely to the flight path.

With this structure, the object zone 17 located between the forward and the backward zones P and Q is divided transversely of the flight path into a plurality of partial zones from which partial optical images are picked up to be focussed on the same focussing area 44, respectively. By way of example, only the forward partial zone P, the backward partial zone Q, and the intermediate partial zone R are illustrated. The intermediate partial zone R is between the forward and the backward partial zones P and Q. The forward and the backward partial zones P and Q are spaced apart from each other along the flight path on the object zone 17. The intermediate zone R is located right under the craft 16.

The first photoelectric element member 41 converts the optical image picked up from the forward zone P to an electrical signal. Likewise, the second and the third photoelectric element members 42 and 43 convert the optical images of the backward zone Q and the intermediate zone R to electrical signals, respectively.

The optical operation of the image pickup apparatus 15 when of the craft 16 reaches a flight position B is illustrated in broken lines in FIG. 3. As described in conjunction with FIG. 1, a stereo image can be formed by processing both of the electrical signals derived from the first photoelectric element member 41 at the flight position A and the electrical signals later derived from the second photoelectric element member 42 at the flight position B. A nonstereo image can be attained by processing the electrical signals derived from the photoelectric element member 43.

Each of the photoelectric element members 41 to 43 may be, for example, a linear array charge-coupled device (CCD). Accordingly, the photoelectric element members 41 to 43 produce a stream of image pulses having a constant readout frequency and a variable amplitude. In other words, each image pulse stream is subjected to pulse amplitude modulation (PAM).

Figure 4:
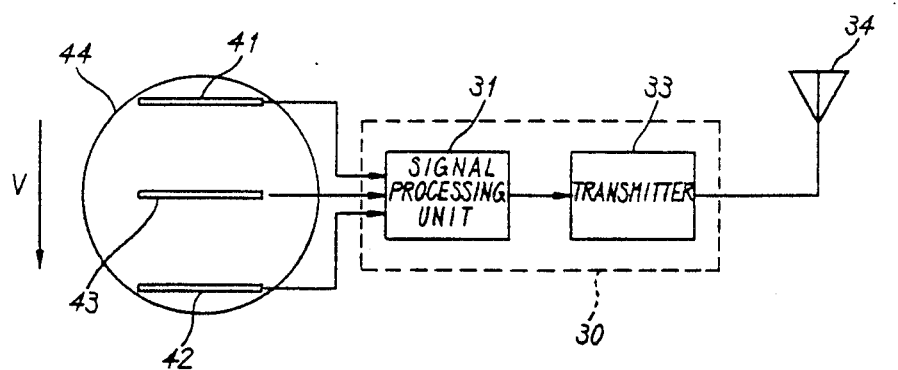
FIG. 4 is a schematic block diagram of an optical system and a signal processing circuit illustrated in FIG. 3.
Figure 5:
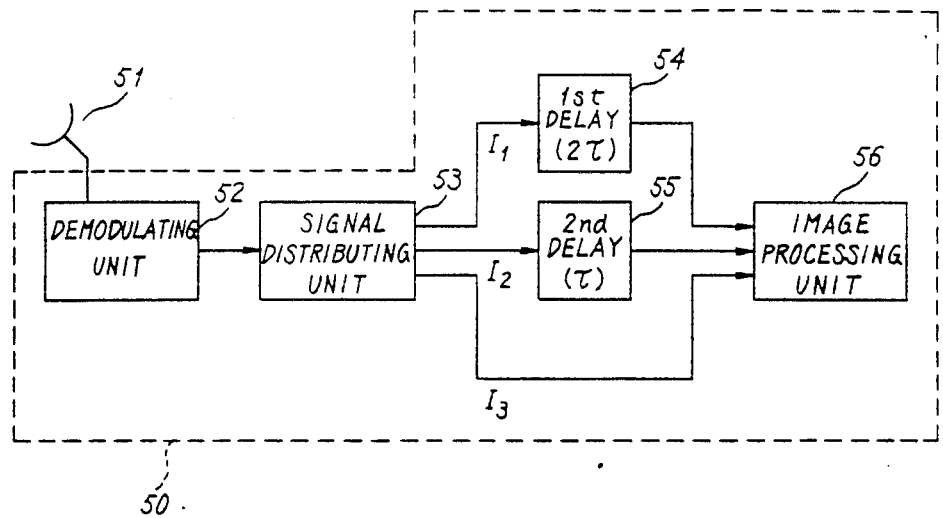
FIG. 5 is a schematic block diagram of a terrestrial station operable as a part of the image pickup system illustrated in FIG. 3.

Referring to FIGS. 4 and 5, the pulse amplitude modulated image pulse streams are sent from the photoelectric element member 41 through 43 to a signal processing circuit 30. As in FIG. 2, a signal processing unit 31 encodes the pulse amplitude modulated image pulse streams into a stream of encoded image data. The encoded image data stream is transmitted by a transmitter 33 through an antenna 34 to a terrestrial station 50. It is to be noted that the signal processing circuit 30 comprises a storage unit, although the storage unit is omitted from FIG. 4. The terrestrial station 50 is operable as a part of the image pickup system according to the first embodiment of this invention.

More particularly referring to FIG. 5, the image data stream transmitted from the craft 16 (FIG. 3) is received at an antenna 51 and sent to a demodulating unit 52 so as to be demodulated into a demodulated image data stream. Responsive to the demodulated image data stream, a signal distributing unit 53 divides the demodulated image data stream into first, second, and third image data trains $I_1$, $I_2$ and $I_3$ which correspond to the photoelectric element members 41, 42, and 43, respectively.

The first and the second image data trains $I_1$ and $I_2$ are delivered to first and second delay units 54 and 55 having first and second delay times. The first delay time is equal to twice the second delay time. Therefore, the first and the second delay times will be represented by $2\tau$ and $\tau$, respectively. Thus, the first and the second image data trains $I_1$ and $I_2$ are supplied to an image processing unit 56 through the first and the second delay units 54 and 55, respectively. On the other hand, the third image data train $I_3$ is sent direct to the image processing unit 56. The image processing unit 56 processes the first through the third image data trains $I_1$ to $I_3$ to form the stereo image and the nonstereo image.

Referring back to FIG. 3, let each of the distances between the partial zone P and the partial zone R and between the partial zone R and the partial zone Q be equal to W (meter). In this event, a time interval 2T (second) during which the craft 16 moves from the flight position A to the flight position B, is given by:

2T=2W/v.

This means that the partial zone P is picked up by the second photoelectric element member 42 after a time interval 2T from the instant at which the partial zone P was picked up by the first photoelectric element member 41. Taking the above into consideration, the first delay time $2\tau$ of the first delay unit 54 is rendered equal to the time interval 2T so as to form the stereo image of the partial zone P.

The craft 16 (FIG. 3) flies through the distance W from the partial zone R to the partial zone P during one-half of the time interval 2T. As a result, the partial zone P is imaged up two times, as readily understood from FIG. 3, and the optical image of the partial zone is delivered from the signal distributing unit 53 to the first and the second delay units 54 and 55 as the first and the second image data trains $I_1$ and $I_2$, respectively. The first image data train $I_1$ is delayed by the first delay unit 41 the first delay time $2\tau$ equal to the time interval 2T while the second image data train $I_2$ is delayed by the second delay unit 42 the second delay time $\tau$ equal to the time interval T. This implies that a stereo image can be attained by processing the first and the second image data trains $I_1$ and $I_2$ as delayed by the first and the second delay units 54 and 55, respectively.

Thus, the stereo image can be prepared by processing both of the first and the third data trains $I_1$ and $I_3$ and both of the first and the second data trains $I_1$ and $I_2$. Of course, the second data trains can also be used for preparing the nonstereo image in the usual manner.

In FIG. 5, each of the delay units 54 and 55 may be composed of digital memory units or the like. Such a delay unit may be placed in the signal processing circuit 30 (FIG. 4) rather than in the terrestrial station 50. In this event, the delay units, such as 54 and 55, may be interposed between the signal processing unit 31 and the first photoelectric element member 41 and between the third photoelectric element member 43 and the signal processing unit 31, respectively.

Figure 6:
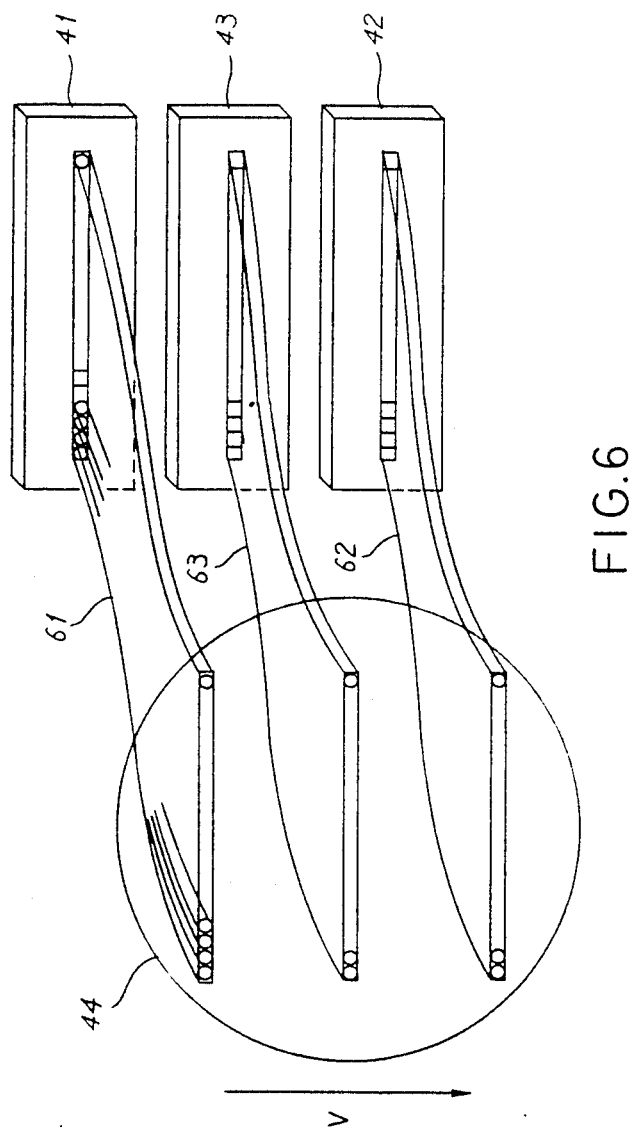
FIG. 6 is an enlarged perspective view of a part of an image pickup system according to a second embodiment of this invention.

Referring to FIG. 6, an image pickup system according to a second embodiment of this invention is similar to that illustrated with reference to FIG. 3 except that first through third sets of optical fiber members 61, 62, and 63 are used between the focussing area of the image plane 44 and the respective photoelectric element members 41, 42, and 43 so as to transmit optical images from the focussing area of the image plane 44 to the respective photoelectric element members 41 to 43. First ends of the optical fiber members 61 to 63 are disposed on the focussing area of the image plane 44 in parallel to one another and transversely of the flight path so as to receive the optical images picked up from the forward partial zone P, the backward partial zone Q, and the intermediate partial zone R, respectively. Second ends of the optical fiber members 61 to 63 are brought into contact with the photoelectric element members 41, 42, and 43, respectively.

Each of the optical fiber members 61, 62, and 63 is composed of a plurality of elongated optical fibers which are independently operable as optical signal transmitting lines. The number of the optical fibers in each of the members 61 to 63 may be, for example, 2000. Optical images incident onto the first ends of the optical fiber members 61 to 63 are transmitted without any leakage to the photoelectric element members 41 to 43.

Inasmuch as the second ends of the optical fiber members 61 to 63 are brought into contact with the photoelectric element members 41 to 43, respectively, it is possible to avoid optical leakage among adjacent ones of the optical images. Thus, the optical images formed on the first ends of the optical fiber members 61 to 63 are effectively transmitted to the photoelectric element members 41 to 43, respectively.

In each of the photoelectric element members 41 to 43, the linear array charge-coupled device comprises elements which are extremely small in size. Each photoelectric element member 41 to 43 further comprises a package which is comparatively bulky in comparison with the elements of the charge coupled device. This is because a lot of terminals, various kinds of wirings, a driving circuit, and the like should be arranged on the substrate in addition to the elements. On the other hand, the focussing area 44 is predetermined in the optical system in size and in position. It is preferable that the photoelectric element members 41 to 43 are disposed apart from the focussing area of the image plane 44.

Figure 7:
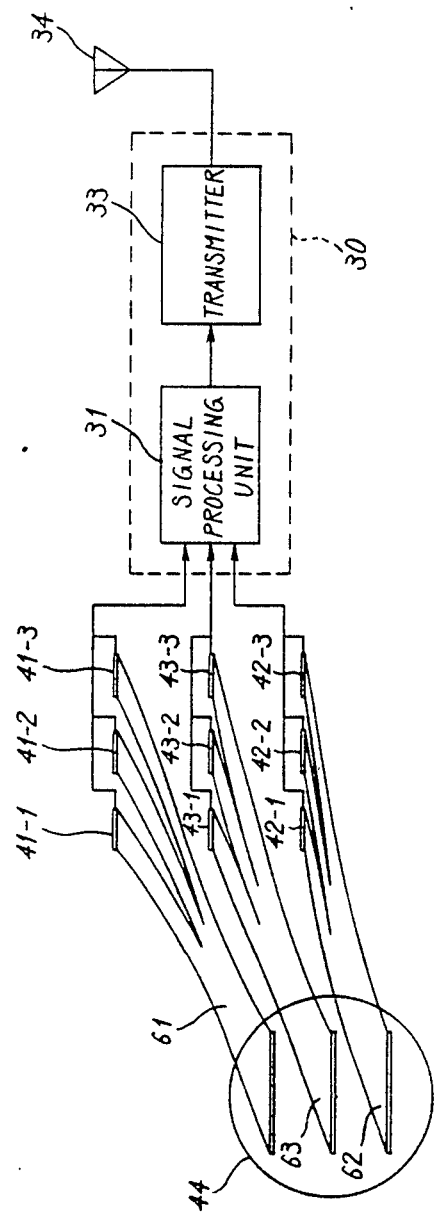
FIG. 7 is a schematic view of a part of an image pickup system according to a modification of the second embodiment illustrated in FIG. 6.

Referring to FIG. 7, an image pickup system according to a modification of the second embodiment comprises first, second, and third optical fiber members 61, 62, and 63, each of which comprises optical fibers equal in number to three times those illustrated in FIG. 6. The increased number of the optical fibers raises the resolution of the optical images. The respective first ends of the first through the third optical fiber members 61 to 63 are placed on the focussing area of the image plane 44. Each of the first through the third optical fiber members 61 to 63 is divided into first, second, and third groups. Each of first, second, and third photoelectric element members 41 to 43 comprises first, second, and third partial photoelectric element groups each of which is similar to that illustrated in FIG. 6 and which are depicted at 41-1 to 41-3, 42-1 to 42-3, and 43-1 to 43-3 with addition of suffixes 1, 2, and 3.

The second ends of the optical fiber groups of the first optical member 61 are brought into contact with the first through the third partial photoelectric element groups 41-1, 41-2, and 41-3, respectively. The second ends of each of the second and the third optical fiber members 62 and 63 are likewise brought into contact with the first through the third partial photoelectric element groups 42-1 to 42-3, and 43-1 to 43-3, respectively.

Figure 8:
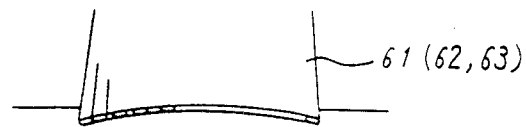
FIG. 8 shows a perspective view of first ends of an optical fiber member or bundle.

Referring to FIG. 8, the focussing area 44 (FIG. 4) is convex, namely, a part of a spherical surface having a center nearer to the object zone 17 (FIG. 3). Each of the first through the third optical fiber members 61 to 63 has a first curved end on the convex focussing area. The first curved end has curvature adjusted to a focussing area. The first curved end is effective to correct curvature of image field when the focussing area is curved.

Figure 9:
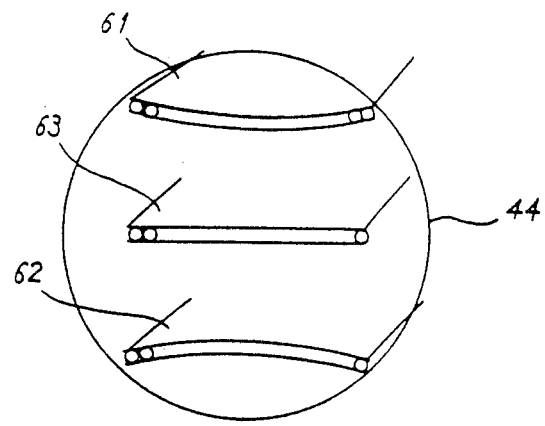
FIG. 9 shows a schematic perspective view of an arrangement of first ends of fiber members according to a further modification of the image pickup system fragmentarily illustrated in FIG. 6.

Referring to FIG. 9, the focussing area 44 is planar as implied heretobefore. The first ends of the first through the third optical fiber members 61 to 63 are on a coplanar plane. The first ends of the first and the second optical fiber members 61 and 62 are curved or warped on the coplanar plane while the third optical fiber member 63 is straight. This arrangement of the first through the third optical fiber members 61 to 63 is useful for correction of that distortion of the optical images which results from the optical system. The focussing area of the image plane 44 may be convex as described in conjunction with FIG. 8.

Figure 10:
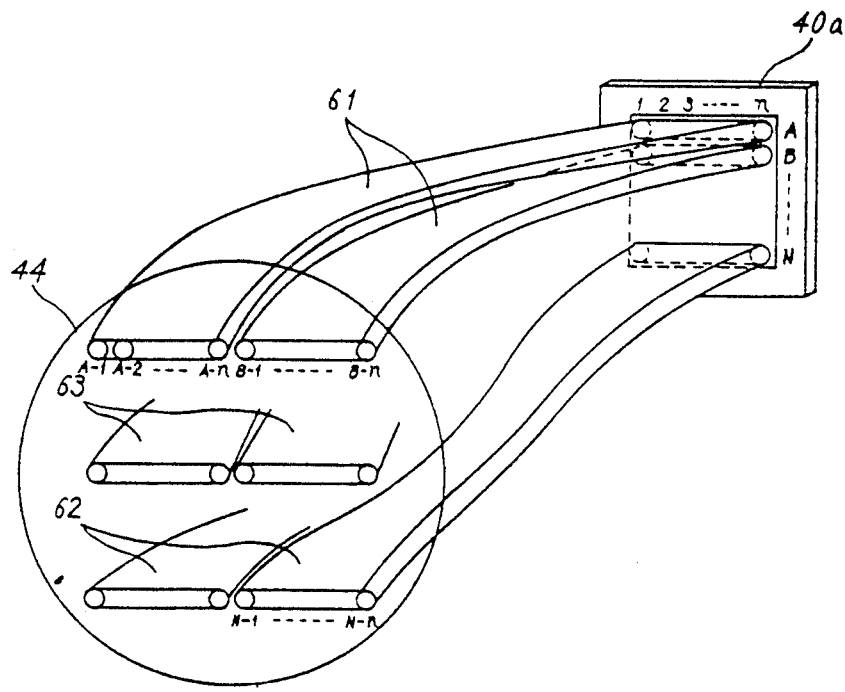
FIG. 10 is a schematic perspective view of another modification illustrated in FIG. 6.

Referring to FIG. 10, an image pickup system according to a modification of the second embodiment is similar to that illustrated in FIG. 7. A single photoelectric element member 40a is used, which is a two-dimensional charge coupled device known in the art and comprises first through N-th rows A through N. Each row comprises first through n-th elements. In accordance with the first through the N-th rows of the photoelectric element, an entirety of the first through the third optical fiber members 61 to 63 is divided into first through N-th partial optical fiber groups. In the example being illustrated, the first optical fiber member 61 comprises the first and the second optical fiber groups A and B. The second optical fiber group 62 includes the N-th optical fiber group N. Each of the first through the N-th optical fiber groups comprises first through n-th optical fibers 1 to n, which are depicted with the diameter exaggerated. The partial optical fiber groups are in one-to-one correspondence to the rows of the photoelectric element member 40a. Moreover, the optical fibers of each partial fiber groups are in one-to-one correspondence to the photoelectric elements of each row. The two-dimensional charge coupled device comprises a great number of photoelectric elements and therefore can store a stereo image at a high resolution.

With this structure, a stereo image can be reproduced by processing electrical signals derived from the first and the second photoelectric element members 41 and 42 (FIG. 3). In addition, it is possible to use the third photoelectric element member 43 in picking up the optical image of a different wavelength and to observe the object zone 17 (FIG. 3) over a wide wavelength band. The stereo image and the nonstereo image can selectively be obtained by selecting the optical images of the first through the third photoelectric members 41 to 43 by the use of a command sent from a terrestrial station to the craft 16. If a common wavelength band is used for the first through the third photoelectric element members 41 to 43, the stereo image can be reproduced by selecting two of the first through the third photoelectric members, such as 41 and 42, 41 and 43, and 42 and 43. Moreover, a specific one of photoelectric element members may be left in an inactive state as a redundant element in a normal mode.

Figure 11:
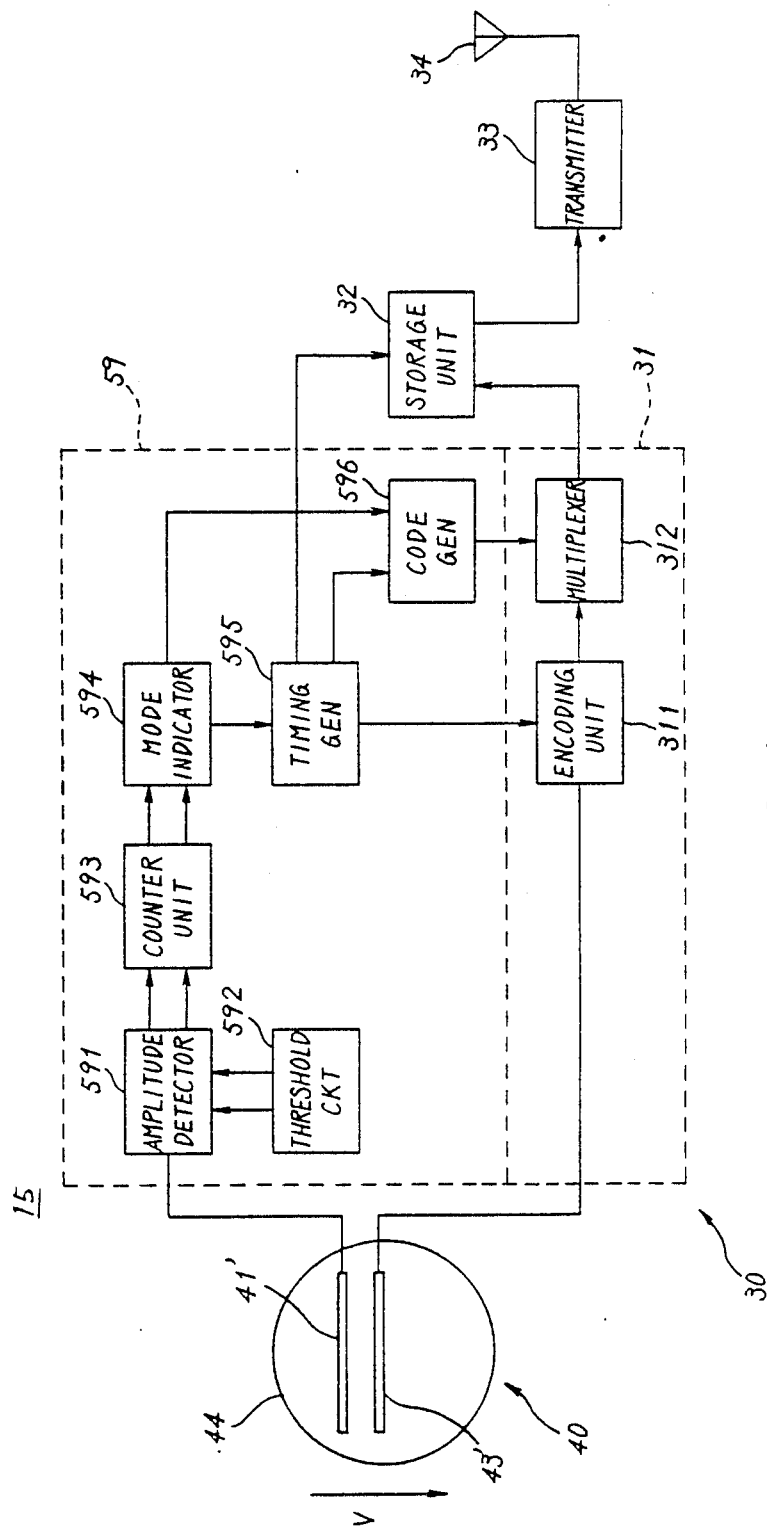
FIG. 11 is a schematic block diagram of an image pickup system according to a third embodiment of this invention.
Figure 12:
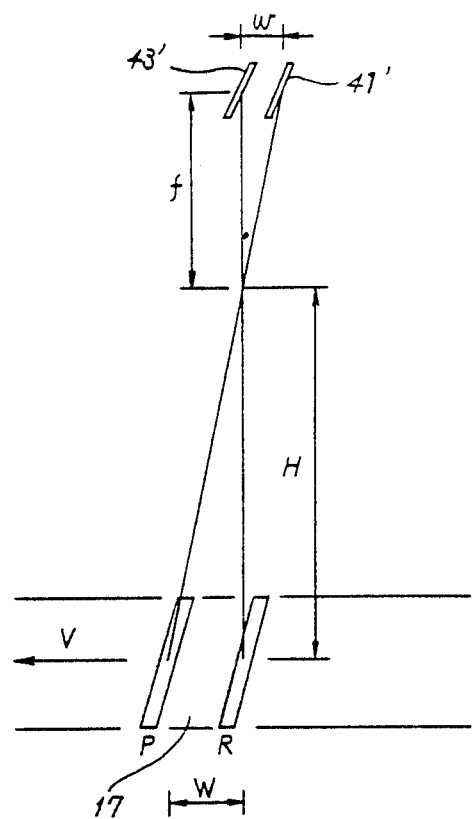
FIG. 12 is a view for use in describing a principle on which the image pickup system illustrated in FIG. 11 is operable.

Referring to FIGS. 11 and 12, an image pickup system according to a third embodiment of this invention will be described. The illustrated image pickup apparatus 15 serves to pick up a high resolution image from the object zone 17 (FIG. 12). The image pickup apparatus 15 comprises a single wide-angle optical system 40 and a signal processing circuit 30. The optical system 40 focuses the optical images of the object zone 17 on a focussing area of the image plane 44 thereof. Only two photoelectric element members are used and denoted at 41' and 43' for convenience of the description which follows. The photoelectric element members 41' and 43' are disposed in parallel on the focussing area of the image plane 44 transversely the flight path and correspond to the photoelectric element members 41 and 43 (FIG. 3) for the forward partial zone P and the intermediate partial zone R, respectively. Therefore, the photoelectric element members 41' and 43' serve to pick up the optical images from partial zones P and R which are forward to and directly under the craft 16, respectively, and which may be called a forward and an under partial zones, respectively. The photoelectric element members 41' and 43' transduce the optical images picked up from the forward partial zone P and the under partial zone R to the electrical signals, respectively.

The signal processing circuit 30 comprises a signal processing unit 31 which will presently be described in detail. The signal processing circuit 30 further comprises a storage unit 32, a transmitter 33, an antenna 34, and a controlling circuit 59. The signal processing unit 31 is operable in a controllable data processing speed and a controllable data access speed as will shortly become clear and comprises an encoding unit 311 and a multiplexer 312. The controlling circuit 59 is for controlling the data processing speed and the data access speed in a manner to be described later and comprises an amplitude detector 591, a threshold circuit 592, a counter unit 593, a mode indicator 594, a timing generator 595, and a code generator 596.

The optical images picked up by the image pickup apparatus may include a land image, a sea image, and a cloud image obtained from a land, a sea, and a cloud, respectively. The land image, the sea image, and the cloud image can be distinguished by detecting the lightness of each optical image. Specifically, the cloud image has the highest lightness while the sea image has the lowest lightness. The land image has an intermediate lightness between the cloud and the sea images. As a result, the cloud image is transduced by the photoelectric element members 41' and 43' into the electrical signals of a high amplitude. Likewise, the sea and the land images are transduced into the electrical signals of a low and an intermediate amplitude, respectively.

In the example being illustrated, discrimination of the forward partial zone P is at first carried out to determine which one of the land, the sea, and the cloud is present in the forward partial zone. For this purpose, the electrical signals from the photoelectric element member 41' are processed to derive a difference of the amplitudes mentioned above. Thereafter, the under partial zone R is determined in accordance with a result of the discrimination of the forward partial zone P. For example, if the forward partial zone P is judged as a specific one of the sea, the land, and the cloud, the under partial zone R is also judged as the same as the specific one of the sea, the land, and the cloud.

It is mentioned here that the land image should be processed at a high resolution in comparison with the sea and the cloud images. Under the circumstances, the data processing speed and the data access speed are varied in compliance with the result of discrimination of the forward partial zone P.

Figure 13:
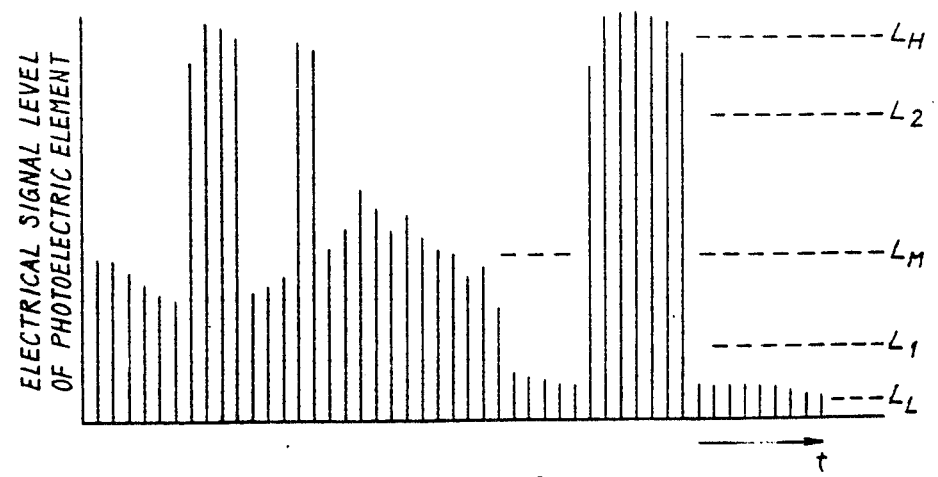
FIG. 13 is a view for use in describing a pulse signal succession produced in the image pickup system illustrated in FIG. 11.

Temporarily referring to FIG. 13, a succession of pulses is exemplified which is produced as the electrical signals by each of the photoelectric element members 41' and 43' and which has a constant readout frequency and an amplitude variable in proportion to the optical images received in the photoelectric element member 41' or 43'. The pulse succession can be obtained by scanning the photoelectric element members 41' and 43' by the use of a sampling pulse sequence having the above-mentioned readout frequency. At any rate, it is possible to understand that the illustrated pulse succession is subjected to pulse amplitude modulation. It is assumed that each pulse of an amplitude near to a first predetermined level $L_H$ represents the cloud image. Likewise, the pulses near to the first predetermined level $L_H$ and a second predetermined level $L_M$ specify the land image while the pulses near to the second predetermined level $L_M$ and a third predetermined level $L_L$ specify the sea image.

Taking the above into consideration, first and second threshold levels $L_1$ and $L_2$ are determined at levels intermediate between the first and the second predetermined levels $L_M$ and $L_L$ and between the second and the third predetermined levels $L_H$ and $L_M$, respectively.

Referring back to FIG. 11, the threshold circuit 592 supplies the amplitude detector 591 with the first and the second threshold levels $L_1$ and $L_2$. The amplitude detector 591 is also supplied with the pulse succession from the photoelectric element member 41' and classifies the amplitude of each pulse with reference to the first and the second threshold levels $L_1$ and $L_2$ into first, second, and third groups. The first group of the pulses has amplitudes which are not higher than the first threshold level while the second group of the pulses has the amplitudes between the first and the second threshold levels $L_1$ and $L_2$, both exclusive. The third group of the pulses has amplitudes which are not lower than the second threshold level $L_2$.

In compliance with the first through the third groups of the pulses, the counter unit 593 comprises three counters (not shown) for individually counting the first through the third groups of the pulses a predetermined duration which is equal to scanning time of the photoelectric element member 41'. With this structure, prediction of the forward partial zone P (FIG. 12) is carried out prior to extraction of the optical images from the under partial zone R so as to determine which one of the land, the sea, and the cloud is present in the forward partial zone. Such prediction is made a time interval T before the under partial zone R is picked up. The time interval T should be equal to W/v.

In FIG. 11, the mode indicator 594 comprises three comparators (not shown) for individually comparing the counts of each of the counters with predetermined reference numbers. The mode indicator 594 produces a mode signal for determining a processing mode of the signal processing unit 31. The processing mode will be described later in detail.

Supplied with the mode signal, the timing generator 595 produces timing signals, which are used in processing the electrical signal in the signal processing unit 31. Although not depicted in detail, the timing generator 595 comprises a clock generator and a controllable frequency divider both of which are known in the art. The frequency divider is supplied from the clock generator with a succession of clock pulses having a preselected repetition frequency and divides the clock pulse succession into the timing signals in accordance with the mode signal.

In the illustrated example, a transmission data succession can be transmitted from the craft to a terrestrial station at a predetermined transmission rate. However, the data processing speed is variable or controllable as mentioned before. Therefore, a code should be multiplexed into the transmission data succession so as to specify the data processing speed in accordance with the mode signal and may be called a speed code signal. To this end, the timing signals are delivered to the code generator 596 coupled to the mode indicator 594. The code generator 596 produces the speed code signal indicative of the selected data processing speed. The speed code signal serves to discriminate the data processing speed at the terrestrial station on reception of the transmission data succession.

The timing signals are also delivered from the timing generator 595 to that encoding unit 311 of the signal processing unit 31 which is supplied with the pulse succession extracted from the photoelectric element member 43'. The encoding unit 311 retimes the pulse succession given from the photoelectric element member 43' into an encoded signal succession in response to the timing signals. The encoded signal succession has a signal rate determined by the mode signal. As known in the art, such an encoding unit 311 may be a combination of a sampling circuit, a holding circuit, and an analog-to-digital converter.

The multiplexer unit 312 is supplied with the encoded signal and the speed code signal which are given from the encoding unit 311 and the code generator 596. The encoded signal is combined with the speed code signal by the multiplexer 312 to be sent to the storage unit 32 as a storage signal succession.

The storage unit 32 may be, for example, a magnetic memory or a semiconductor memory accessible at the data access speed controllable or variable in response to the timing signals supplied from the timing generator 595. The storage signal succession is stored in the storage unit 32 at the data access speed indicated by the timing signals. Thereafter, the storage signal succession is read out of the storage unit 32 at a constant data readout speed, differing from storing operation for the storage signal succession.

Referring more particularly to FIGS. 11 and 13, operation of the counter unit 593 and the mode indicator 594 will be described more in detail. Each counter of the counter unit 593 counts each of the first through the third groups of pulses the predetermined duration as mentioned before. Let the first group of the pulses be counted to a number $n_H$ and the second group of pulses be counted to another number $n_M$. If the number $n_M$ is greater than a first reference number $n_1$, it is seen that the land images are extracted from the forward partial zone P. In this event, the mode indicator 594 produces the mode signal representation of a normal mode, namely, a high speed mode. The encoding unit 311 and the storage unit 32 are put into operation at normal one of the data processing speed and a normal one of the data access speed, respectively. In the normal mode, the pulse succession extracted from the photoelectric element member 43' is sampled at a normal sampling frequency in the encoding unit 311.

It is assumed that the numbers $n_M$ and $n_H$ are less than the first reference number $n_1$ and a second reference number $n_2$, respectively. This means that the sea images are abundant in the optical images derived from the forward partial zone P. The mode indicator 594 produces the mode signal representative of a lower-speed mode. In this event, the sampling frequency of the encoding unit 311 and the data access speed for the storage unit 32 are reduced, for example, to values selected between a half and one fourth of the sampling frequency and the data access speed in the normal mode, respectively.

If the number $n_M$ is not greater than the first reference number $n_1$ and furthermore if the number $n_H$ is not less than the second reference number $n_2$, it is seen that the forward partial zone P is almost covered with the cloud. In other words, the cloud images are rich in the optical images derived from the forward partial zone P. The mode indicator 594 produces the mode signal representative of a lowest-speed mode. In this case, the sampling frequency and the data access speed are reduced to values which may be between one tenth and one hundredth of the sampling frequency and the data access speed of the normal mode, respectively. Alternatively, storing operation may be interrupted by rendering the data access speed of the storage unit 32 to zero.

The numbers $n_1$ and $n_2$ are determined on designing the image pickup apparatus. The numbers $n_1$ and $n_2$ may be, for example, values equal to 5% and 90% of the number n of the whole optical images derived from one scanning line, respectively. The numbers $n_1$ and $n_2$ and the data processing speed and the data access speed can be changed to suitable values by a command sent from a terrestrial station to the craft.

The pulse succession sent from the photoelectric element member 43' is processed in accordance with the mode signal produced by processing of the pulse succession sent from the photoelectric element member 41'.

Let the photoelectric element member 43' be scanned immediately after the photoelectric element member 41'. In other words, the photoelectric element member 43' may be sqanned with a delay of one scanning period relative to scanning of the photoelectric element member 41'.

This operation is possible when the data access speed of the storage unit 32 can rapidly be switched from one to another. In this event, the photoelectric element member 41' may be placed in close vicinity of the photoelectric element member 43' on the focussing area 44.

Similar processing is possible without any lack of effective information in the following manner even when the data access speed of the storage unit 32 is slowly switched.

Referring back to FIG. 12, the photoelectric element members 41' and 43' are disposed on the craft with a member distance w left therebetween. The optical system is assumed to have a focal length f. Let the craft fly at a velocity v at an altitude H over the partial zones P and R spaced apart from each other by a zone distance W. Under the circumstances, the partial zone P is predictively picked up by the photoelectric element member 41' at a current time instant. The partial zone P is again picked up by the photoelectric element member 43' after an interval $\tau_a$ of time given by:

$$\tau_a = W/v,$$
$$= (H/f) \cdot (w/v).$$

The interval $\tau_a$ of time can be controlled by selecting the member distance w when the altitude H and the velocity v are predetermined for the craft as is the case with an artificial satellite. Therefore, it is possible to make the interval $\tau_a$ of time longer than the switching speed of the storage unit 32.

With the structure, it is possible to switch the modes of the pickup apparatus from one to another. For example, when a lower one of the speed modes is switched to a higher one of the modes, switching operation ends within the interval $\tau_a$ of time immediately after detection of the facts that $n_M \geq n_1$ and that $n_H < n_2$.

On the other hand, when a higher one of the speed modes is switched to a lower one of the modes, a guard time is necessary so as to insure whether or not such switching is certainly allowable. Otherwise, the land images may wrongly be processed at a low data processing speed and a low data access speed. When detection of $n_M < n_1$ and $n_H \geq n_2$ is repeated m times, the mode indicator 594 switches the mode from the higher-speed mode to the lower one. Inasmuch as such mode switching should not be carried out within the interval $\tau_a$ of time, the value of m is given by:

$$m \geq \tau_a/\tau_H,$$

where $\tau_H$ is the scanning duration of the photoelectric element member 42'.

Thus, a succession of important information data picked up from the land is stored in the storage unit 32 at the high data access speed while a succession of less important data picked up from the sea and the cloud is stored at the low data access speed. Inasmuch as the data access speed of the storage unit 32 accords with a data rate of the storage data succession in the storage unit 32, the storage data succession is stored in the storage unit 32 at a uniform density. Therefore, readout operation may be performed at a uniform data access speed so as to send a readout data succession as the transmission data succession to the terrestrial station through the transmitter 33 and the antenna 34.

Figure 14:
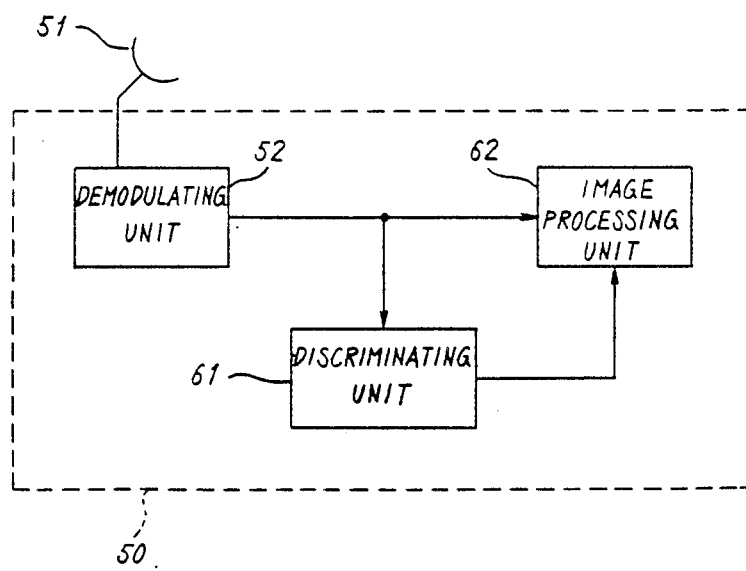
FIG. 14, drawn below

Referring to FIG. 14, a terrestrial station 50 serves as a part of the image pickup system cooperating to the pickup apparatus described in conjunction with FIGS. 11 through 13.

The image data succession transmitted from the craft is received at an antenna 51 and sent to a demodulating unit 52 so as to be demodulated into a demodulated image data succession. A discriminating unit 61 extracts the speed code signal from the demodulated image data succession. The extracted speed code signal is sent to a reception image processing unit 62. The reception image processing unit 62 switches a data processing speed thereof in accordance with the speed code signal.

The cloud and the sea images may be processed in a simple manner in comparison with the land image because a small amount of information is received as regards the cloud and the sea images.

While this invention has so far been described in conjunction with a few preferred embodiments thereof and several modifications, it is readily possible for those skilled in the art to put the invention into practice in various other manners. For example, the focussing area 44 may either be convex or an otherwise curved surface in FIG. 8.

Switching operation may be carried out not only for the sampling frequency but also for an input gain and a quantization level. The switching operation may be switched between linear quantization and nonlinear quantization. The threshold levels $L_1$ and $L_2$ can be changed by the use of a command sent from the terrestrial station to the craft. Moreover, if the flight path is previously known, the threshold circuit 591 may have a program controlling function. Observation may be carried out over a wide wavelength band divisible into a plurality of partial wavelength bands. The photoelectric element members may be provided for the respective partial wavelength bands. In this case, a plurality of optical filters are necessary for the respective partial wavelength bands and switched in synchronism with the mode switching.

In the image pickup system illustrated in FIG. 11, it is possible to reduce the memory capacity of the storage unit 32 because an amount of information to be stored is reduced by dividing the information into important information and less important one.

What is claimed is:

1. An image pick up system for use with a craft capable of flying along a flight path over over an object zone to be imaged, said system comprising:
   (A) a single optical system for projecting an image of said object zone onto an image plane, said image plane having:
      (1) a forward zone onto which said optical system projects an image of a first portion of said object zone; and
      (2) a rearward zone onto which said optical system projects an image of a second portion of said object zone; said first portion of said object zone being located at a position forward of said second portion of said object zone relative to the movement of said craft along said flight path whereby said forward zone of said image plane receives a forward optical image of a forward portion of said object zone and said rearward zone of said image plane receives a rearward optical image of a rearward portion of said object zone;
   (B) first transducer means for converting only said forward optical image into forward electrical signals representative of said forward portion of said object zone;
   (C) second transducer means for converting only said rearward optical image into backward electrical signals representative of said rearward portion of said object zone; and
   (D) signal processing means for processing said forward and backward electrical signals.

2. An image pickup system as claimed in claim 1, wherein said signal processing means comprises:
   delay means for giving a predetermined delay to said forward one of the electrical signals to produce a delayed electrical signal, said predetermined delay being such that said delayed electrical signal appears concurrent with said backward one of the electrical signals; and
   image reproducing means responsive to said delayed electrical signal and to said backward one of the electrical signals for producing a stereo image of said object zone.

3. An image pickup system as claimed in claim 1, wherein said signal processing means comprises:
   signal disposing means for disposing said forward and said backward electrical signals separately of said craft; and
   means to be mounted on said craft for transmitting the forward and the backward electrical signals transduced by said photoelectric transducing members to said signal disposing means as a transmission signal.

4. An image pickup system as claimed in claim 3, wherein said signal disposing means comprises:
   means for receiving said forward and said backward electrical signals as a received forward signal and a received backward signal which carry said forward and said backward optical images, respectively;
   delaying means for giving a prescribed delay to said received forward signal to produce a delayed forward signal, said prescribed delay being such that said delayed forward signal appears concurrent with said received backward signal; and
   image reproducing reproducing means resposive to said delayed forward signal and said received backward signal for reproducing a stereo image of said object zone.

5. An image pick up system as claimed in claim 1, wherein said image plane is an imaginary plane.

6. An image pick up system as claimed in claim 1, wherein said first and second transducer means are each located in said image plane.

7. An image pick up system as claimed in claim 1, wherein said first transducer means is separate from said second transducer means.

8. An image pick up system as claimed in claim 1, wherein said signal processing means processes said forward and backward electrical signals to generate a stereo image as a function of both said forward and backward electrical signals.

9. An image pick up system as claimed in claim 1, wherein said optical system projects a single image onto said image plane.

10. An image pickup system as claimed in claim 9, wherein said signal processing means comprises:

a signal processing element having a controllable processing speed and coupled to said second transducer means for processing said rearward electrical signal at said controllable processing speed to produce a processed electrical signal;

storage means accessed by a controllable access speed and coupled to said signal processing element for storing said processed electrical signal; and control means coupled to said second first transducer means and to said storage means and said signal processing element for controlling said access speed and said processing speed with reference to said forward one of the electrical signals.

11. An image pickup system as claimed in claim 10, said forward electrical signal being a succession of pulses having a predetermined readout frequency and amplitudes variable between a maximum and a minimum level of said forward optical image, both of said maximum and said minimum levels inclusive, wherein said control means comprises:

amplitude classifying means having at least one threshold level between said maximum and said minimum levels, both exclusive, and coupled to said first transducer means for classifying said pulse succession into a plurality of partial pulse successions with reference to said at least one threshold level;

counter means coupled to said amplitude classifying means for individually counting said partial pulse successions a predetermined duration to individually produce counts, respectively;

comparator means for comparing said counts with predetermined reference numbers to produce results of comparison, respectively;

detection means responsive to said results of comparison for detecting said forward optical image to control said access speed and said processing speed.

12. An image pick up system as claimed in claim 1, wherein said first and second transducer means each include a respective linear array of transducer elements.

13. An image pick up system as claimed in claim 12, wherein said linear arrays of transducer elements are positioned parallel to one another.

14. An image pick up system as claimed in claim 13, wherein said linear arrays of transducer elements are positioned perpendicular to said flight path.

* * * * *